(12) United States Patent
Neuwirth

(10) Patent No.: US 12,440,008 B1
(45) Date of Patent: Oct. 14, 2025

(54) STEADY STAFF

(71) Applicant: Thomas Joseph Neuwirth, Sebastopol, CA (US)

(72) Inventor: Thomas Joseph Neuwirth, Sebastopol, CA (US)

( * ) Notice: Subject to any disclaimer, the term of this patent is extended or adjusted under 35 U.S.C. 154(b) by 0 days.

(21) Appl. No.: 19/176,549

(22) Filed: Apr. 11, 2025

Related U.S. Application Data

(60) Provisional application No. 63/633,290, filed on Apr. 12, 2024.

(51) Int. Cl.
    *A45B 9/02*     (2006.01)
    *A45B 9/00*     (2006.01)
    *A45B 9/04*     (2006.01)
    *F16M 13/08*     (2006.01)

(52) U.S. Cl.
    CPC ............ *A45B 9/02* (2013.01); *A45B 9/04* (2013.01); *F16M 13/08* (2013.01); *A45B 2009/007* (2013.01)

(58) Field of Classification Search
    CPC .................... A45B 2009/007; F16M 13/08
    See application file for complete search history.

(56) References Cited

U.S. PATENT DOCUMENTS

| | | | | |
|---|---|---|---|---|
| 2,839,865 A * | 6/1958 | Lubanski | ............... | A01K 87/00 43/18.1 R |
| 2,960,095 A * | 11/1960 | Smith, Jr. | ................ | A45B 3/00 135/65 |
| 4,497,092 A * | 2/1985 | Hoshino | ............... | F16B 7/1418 24/514 |
| 4,742,837 A * | 5/1988 | Rise | ........................ | F16M 13/08 135/66 |
| 4,809,725 A * | 3/1989 | Champigny | .............. | A61H 3/02 135/75 |
| 6,769,824 B2 * | 8/2004 | Nakatani | ................ | F16M 11/00 396/419 |
| H2138 H * | 1/2006 | Pullman | .......................... | 135/71 |
| 7,244,070 B2 * | 7/2007 | Burnett | ................... | G03B 17/00 396/420 |
| 8,006,711 B2 * | 8/2011 | Pietrzak | .................... | A45B 9/00 135/65 |
| 8,496,018 B2 * | 7/2013 | Lenhart | ................. | A63C 11/221 280/823 |
| 10,172,427 B2 * | 1/2019 | D'Jay | .................. | B65D 23/001 |
| 10,986,903 B2 * | 4/2021 | Liu | ............................ | A45B 9/00 |
| 2023/0380555 A1 * | 11/2023 | Unice | ................... | F16M 11/041 |

* cited by examiner

*Primary Examiner* — Noah Chandler Hawk
(74) *Attorney, Agent, or Firm* — My Patent Guys; Christopher Pilling

(57) ABSTRACT

The present invention provides a multifunctional telescopic support staff adaptable for diverse indoor and outdoor activities. It significantly improves upon conventional support devices in terms of stability, adjustability, and versatility. The steady staff is particularly beneficial for individuals requiring stable support due to conditions such as essential tremor, facilitating enhanced mobility and steady support for optical devices, and serving as a structural component in temporary shelters.

15 Claims, 6 Drawing Sheets

STEADY STAFF

CROSS-REFERENCE TO RELATED APPLICATIONS

This application claims priority to U.S. Provisional Application Ser. No. 63/633,290, filed Apr. 12, 2024, which is hereby incorporated in its entirety at least by reference.

BACKGROUND OF THE INVENTION

1. Field of the Invention

The present invention relates generally to support devices and more particularly to a versatile, adjustable staff designed to provide stability and support for various activities.

2. Description of Related Art

Individuals who enjoy outdoor activities such as wildlife observation, photography, and hiking often need support for both mobility and equipment use, especially when facing physical challenges like essential tremor. Traditional supports and monopods may provide limited functionality and insufficient stability, particularly on varied terrains or for extended use. Thus, there exists a need for a more adaptable, robust, and easy-to-use support device that accommodates a wide range of uses and personal stability needs. For example, many users resort to carrying separate walking sticks and camera tripods, which can be cumbersome, and even then struggle to maintain stability on uneven ground or with shaky hands.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the present invention to provide a telescopic support staff that offers enhanced stability and versatility during a variety of outdoor and indoor activities, including walking, hiking, and photography. It is another object of the present invention to provide a lightweight staff that can be easily extended to a fully functional length and retracted to a compact size for convenient storage and portability. It is a further object of the present invention to include a cross-piece that serves as a resting surface for devices such as cameras, binoculars, or other accessories requiring stabilization. It is yet another object of the present invention to incorporate locking clamp mechanisms that allow the user to quickly adjust the staff to various heights and securely lock the tubular sections in place. It is still another object of the present invention to provide a durable tip configured to enhance traction on a wide range of terrains, thereby supporting individuals who experience stability challenges and require a reliable support device.

In order to do so, a telescopic staff apparatus is provided, comprising a telescopic body including a plurality of tubular sections, each tubular section being dimensioned to slide at least partially within an adjacent tubular section, wherein the telescopic body is adjustable between a retracted configuration and an extended configuration; a plurality of locking clamp mechanisms, each locking clamp mechanism being configured to releasably secure a pair of adjacent tubular sections at a selected telescopic length; a cross-piece assembly positioned at an upper portion of the telescopic body, the cross-piece assembly configured to provide a resting surface for a user's hand or an accessory; and a tip disposed at a lower portion of the telescopic body, wherein the tip is adapted to engage a support surface and provide traction for the telescopic staff apparatus.

In one embodiment, each tubular section is constructed from carbon fiber. In one embodiment, the telescopic body in the retracted configuration has a length of 25 inches, and in the extended configuration has a length of 75 inches. In one embodiment, the cross-piece assembly comprises an interior rigid support member; a surrounding layer of cushioning material disposed about the rigid support member, wherein the cushioning material is configured to enhance user comfort and reduce vibrations; and wherein the cross-piece is not a handle. In another embodiment, the cross-piece has a lateral dimension of approximately 5.5 inches, such that it extends transversely relative to the longitudinal axis of the telescopic body to provide a resting surface for devices. In one embodiment, the locking clamp mechanisms each comprise a flip-lock clamp configured to permit selective sliding movement of an adjacent tubular section and to secure the adjacent tubular section in place upon engagement of the flip-lock clamp. In one embodiment, the tip comprises a rubber material having a traction-enhancing surface to promote stability on varying terrains. In yet another embodiment, one or more fasteners are provided coupling the cross-piece assembly to the uppermost tubular section. In one embodiment, the plurality of tubular sections comprises exactly four tubular sections that are cylindrical in shape and sized in descending outer diameters so that each smaller-diameter section is receivable in a larger-diameter section. In yet another embodiment, when fully extended, the telescopic staff apparatus is taller than an average user's height to enhance user stability during use. In one embodiment, the accessory is a pair of binoculars or a camera.

In another aspect of the invention, a method of providing stability to a user during an outdoor activity, the method comprising providing a telescopic staff having a plurality of tubular sections adjustable between an extended configuration and a retracted configuration, a cross-piece assembly on an upper portion thereof, and a tip on a lower portion thereof; extending the telescopic staff to a desired length suitable for the height of the user and the terrain; locking each tubular section in place by engaging a corresponding locking clamp mechanism; gripping a segment of the telescopic staff; and supporting the user's weight on the telescopic staff to enhance balance and reduce vibrations due to tremors or uneven ground.

In one embodiment, further comprising resting an optical device on the cross-piece assembly to stabilize the optical device during observation. In one embodiment, further comprising utilizing the telescopic staff as a support pole to hold a portion of a tarp or temporary shelter in place. In one embodiment, the telescopic staff is retracted to about 25 inches for transport and storage before being extended up to 75 inches for active use. In one embodiment, the telescopic staff is constructed at least partially of carbon fiber so as to weigh approximately 1.25 pounds for improved portability and ease of handling by users with reduced strength. In another embodiment, further comprising adjusting the telescopic staff to a height above the user's shoulder level to increase leverage and stability during hiking or walking activities. In one embodiment, the tip comprises a rubber foot configured to provide traction on a variety of terrains. In one embodiment, the locking of each tubular section comprises a further step of engaging a flip-lock clamp, positioning a given tubular section at a desired length, and flipping the clamp to secure the tubular section in a fixed position.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a versatile staff device, herein "the steady staff."

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
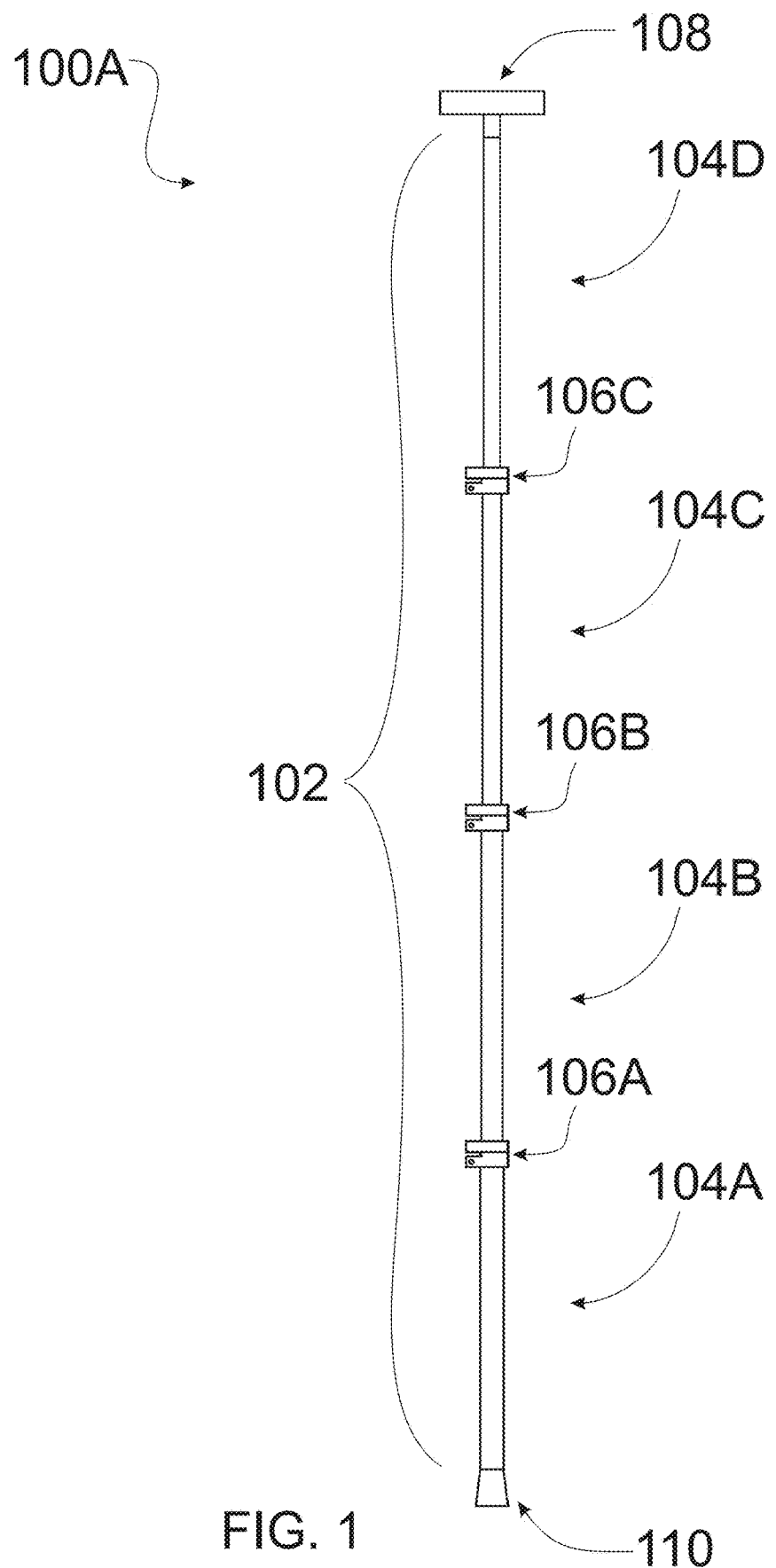
FIG. 1 is a front view of the steady staff in an extended position according to an embodiment of the present invention.

FIG. 1 is a front view of the steady staff in an extended position according to an embodiment of the present invention. Referring to FIG. 1, the steady staff in an extended positioned 100A is illustrated. In one embodiment, the steady staff comprises a telescopic body 102 comprising a number of sections or segments 104A, 104B, 104C, and 104D that enables the user to adjust the overall length of the staff, which will be discussed in further details below. In one embodiment, there are exactly four sections or segments. In one embodiment, each section of the number of sections (104A-D) are cylindrical and constructed from carbon fiber tubing, offering the advantage of being both lightweight and durable. Although each section of the number of sections (104A-D) is preferably made from carbon fiber for its superior strength-to-weight ratio, other suitable materials may also be utilized without departing from the inventive scope. Such alternative materials include lightweight metals such as aluminum or titanium alloys, fiberglass, polymer composites, or reinforced plastics. The choice of these materials may vary depending on specific user requirements, intended environmental conditions, desired durability, or cost considerations. For example, aluminum alloys offer a cost-effective, corrosion-resistant option, while titanium provides high strength and exceptional corrosion resistance, particularly beneficial in harsh outdoor environments. Fiberglass and reinforced polymer composites offer advantageous weight savings and resistance to weathering at a moderate cost.

Still referring to FIG. 1, in some embodiments, the telescopic body 102 comprises a number of locking clamp mechanisms 106A, 106B, and 106C that enable the user to adjust the length of each section (104A-D). It should be noted that each section varies in (outer) diameter which allows the smaller diameter of an adjacent section to fit inside of the hollow interior of the larger section. For example, although the diameters may vary, in one embodiment, section 104A is approximately 1¼" in diameter, section 104B is approximately 1⅛" in diameter, section 104C is approximately 1" in diameter, and section 104D is approximately ⅛" in diameter. In one embodiment, each section tube has a thickness of approximately 1.22 mm, which is specifically for the carbon fiber tube. It should be understood that the diameters and thickness may vary depending on the material selected.

Figure 4:
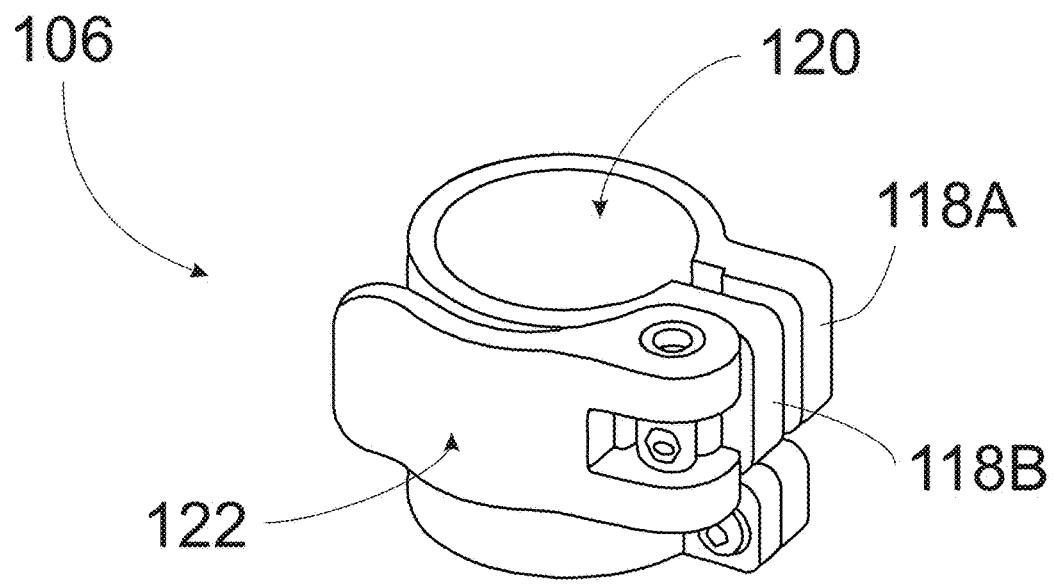
FIG. 4 is a detailed view of a locking clamp mechanism according to an embodiment of the present invention.
Figure 5:
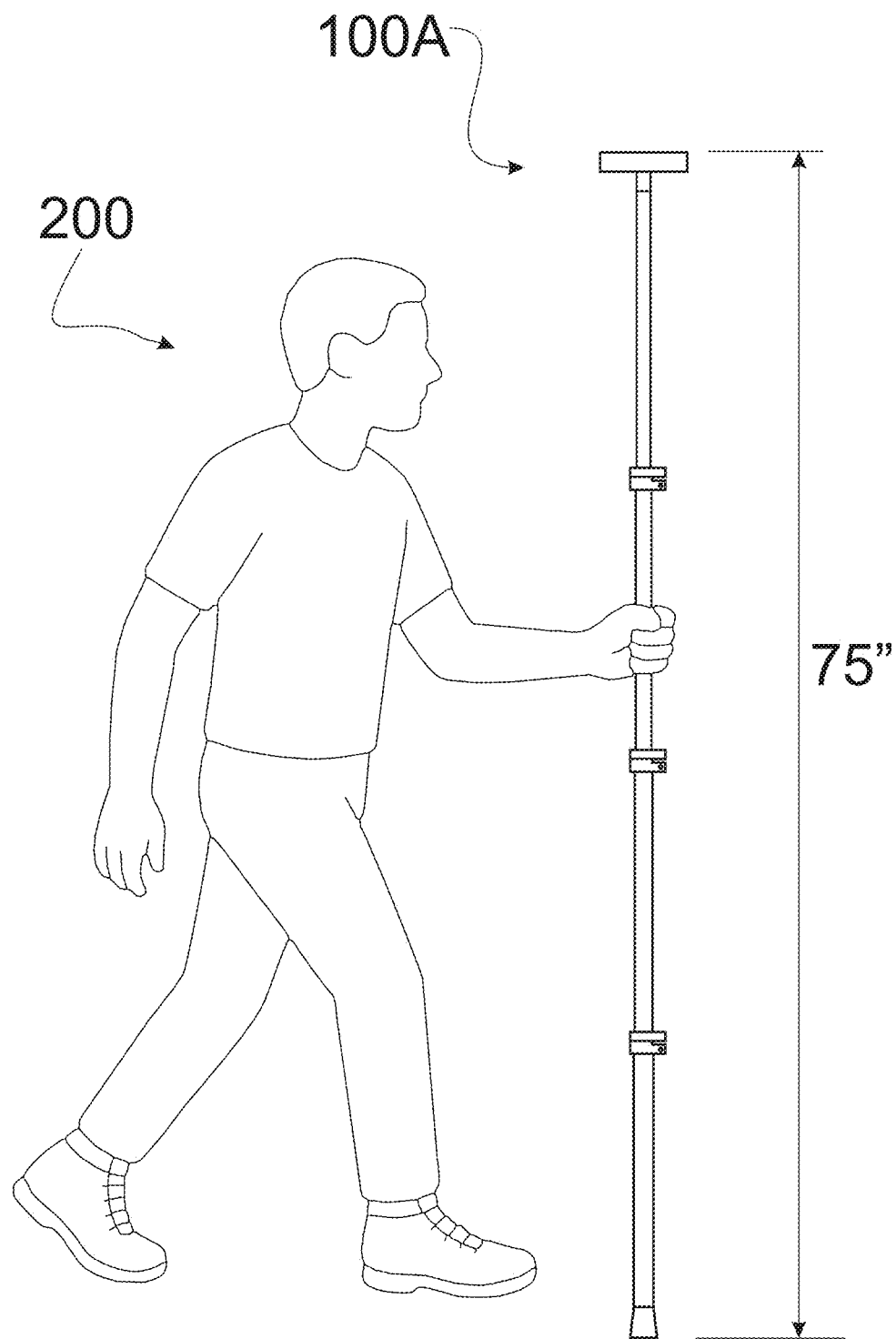
FIG. 5 is the steady staff in use in a fully extended position according to an embodiment of the present invention.
Figure 7:
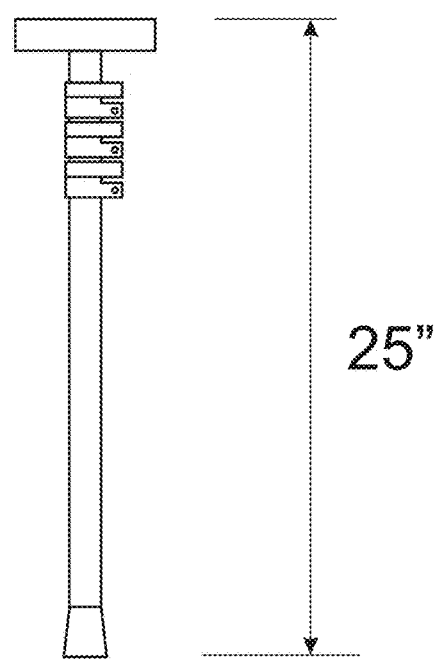
FIG. 7 is a front view of the steady staff in a retracted position according to an embodiment of the present invention.
Figure 8:
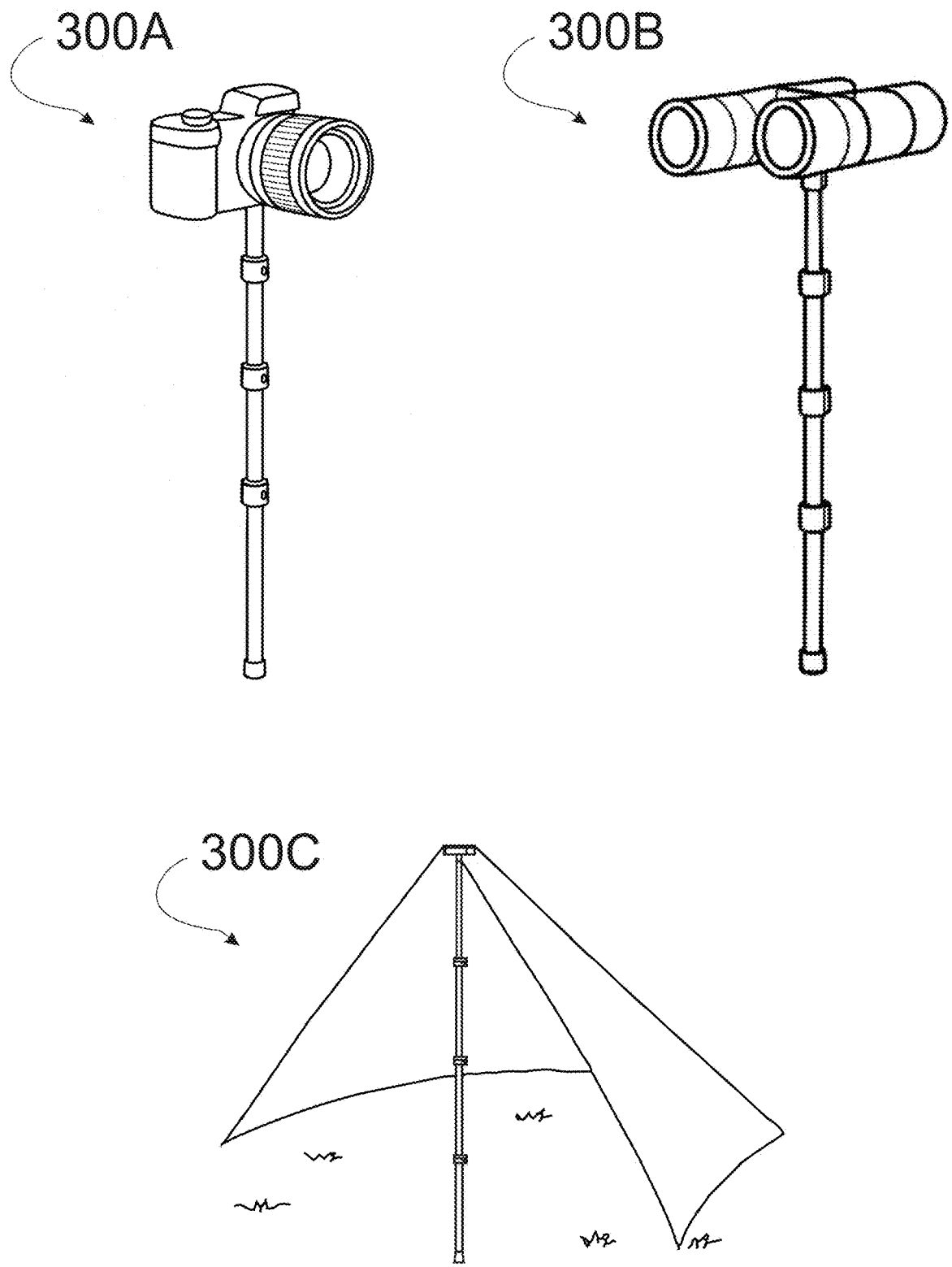
FIG. 8 are various views of the steady staff in alternative configurations according to embodiments of the present invention.

Adjustment of the telescoping body sections (104A-D) is easily achieved through the number of locking clamping mechanisms (106A-C), operable by the user's thumb or fingers. Best seen in FIG. 4, to adjust, the user releases each flip-lock clamp 122, telescopically extends or contracts the corresponding cylindrical segment to the desired length, and then re-secures the clamp to lock the segment firmly in place. As known in the art, the flip-lock clamping mechanism as described features an adjustable diameter 120 via two sections 118A and 11B that are configured to extend or retract a desired amount such that when the flip-lock clamp 122 is released (in an open position) the segments may be moved extended or retracted, and when the flip-lock clamp 122 is in the locked or closed position the segments are fixed in the desired length. In some embodiments, a portion of each segment is fixed or secured within a locking clamp mechanism to prevent any segments from being extended too far such that the overall telescoping body maintains its structure and integrity. As seen in FIGS. 5 and 7, the steady staff may be extended to approximately 75" in length and retracted to only 25" in length, and any length in between. In other embodiments, alternative telescoping lock designs may be used in place of the flip-lock clamps, for example, twist-lock collars or spring-biased detent pins, to achieve the same secure adjustable functionality without departing from the invention.

Figure 3:
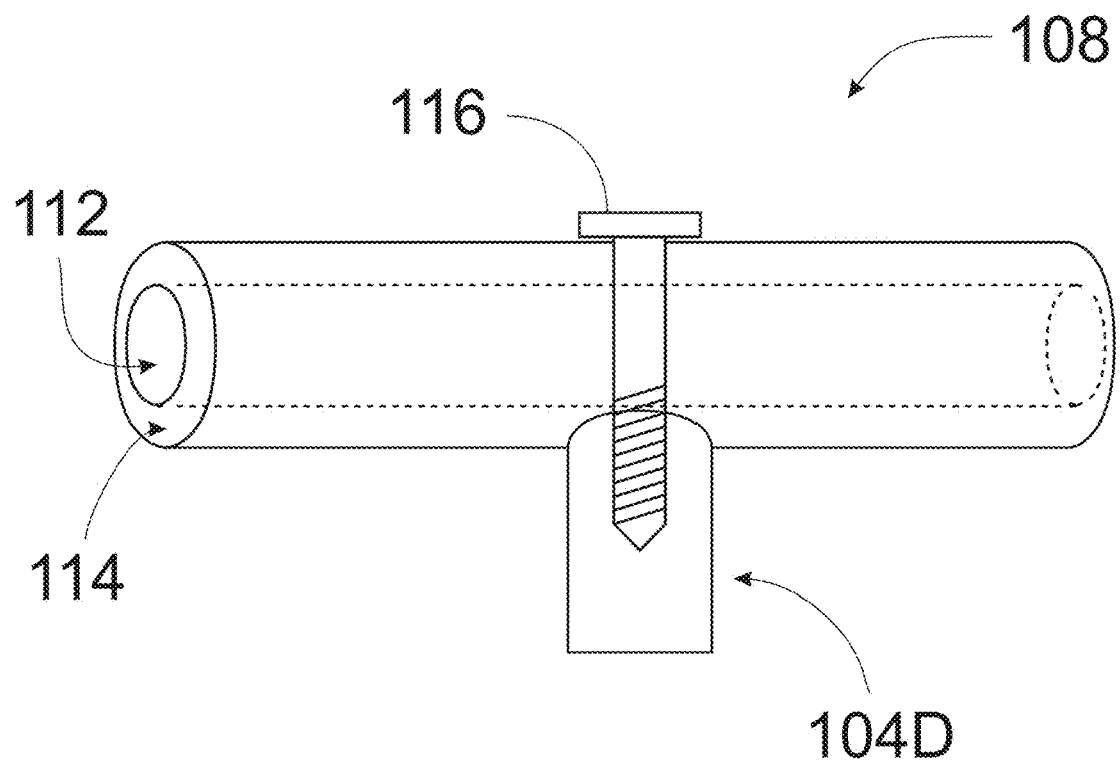
FIG. 3 is a detailed view of the cross-piece assembly of the steady staff according to an embodiment of the present invention.

Now referring to FIGS. 1 and 3, the steady staff includes a cross-piece 108. In one embodiment, the cross-piece measures approximately 5.5 inches in length and is constructed from sturdy aluminum tubing 112 encased within a layer of comfortable foam rubber 114. In one embodiment, the aluminum tubing is ¾" in outer diameter, and the foam is ¼" in thickness. This crosspiece is specifically designed to provide a secure, cushioned support surface ideal for handling and to support optional devices which will be discussed in further detail below. In one embodiment, the cross-piece is secured to a portion of segment 104D via fastening member (bolt) 116. In other embodiments, the cross-piece assembly may be removably attached or interchangeable. For instance, the cross-piece can be detached or replaced with an alternate accessory (such as a camera mount or rifle yoke) to broaden the device's functionality. In certain embodiments, a wrist strap or lanyard is attached near the cross-piece assembly, providing additional security by tethering the staff to the user's wrist and preventing accidental dropping.

In some embodiments, the lower end of the steady staff includes a durable rubber tip 110 suitable for providing enhanced stability and traction across a wide range of terrains, including rocky, muddy, or otherwise uneven surfaces. In one embodiment, the tip 110 is part of an interchangeable system, allowing different tip attachments (e.g., a metal spike for ice or a broad foot for sand) to be swapped in to optimize traction on specific terrains. Additionally, a shock-absorbing mechanism can be integrated near the tip to dampen impacts and reduce vibration transmitted to the user's hand.

Figure 2:
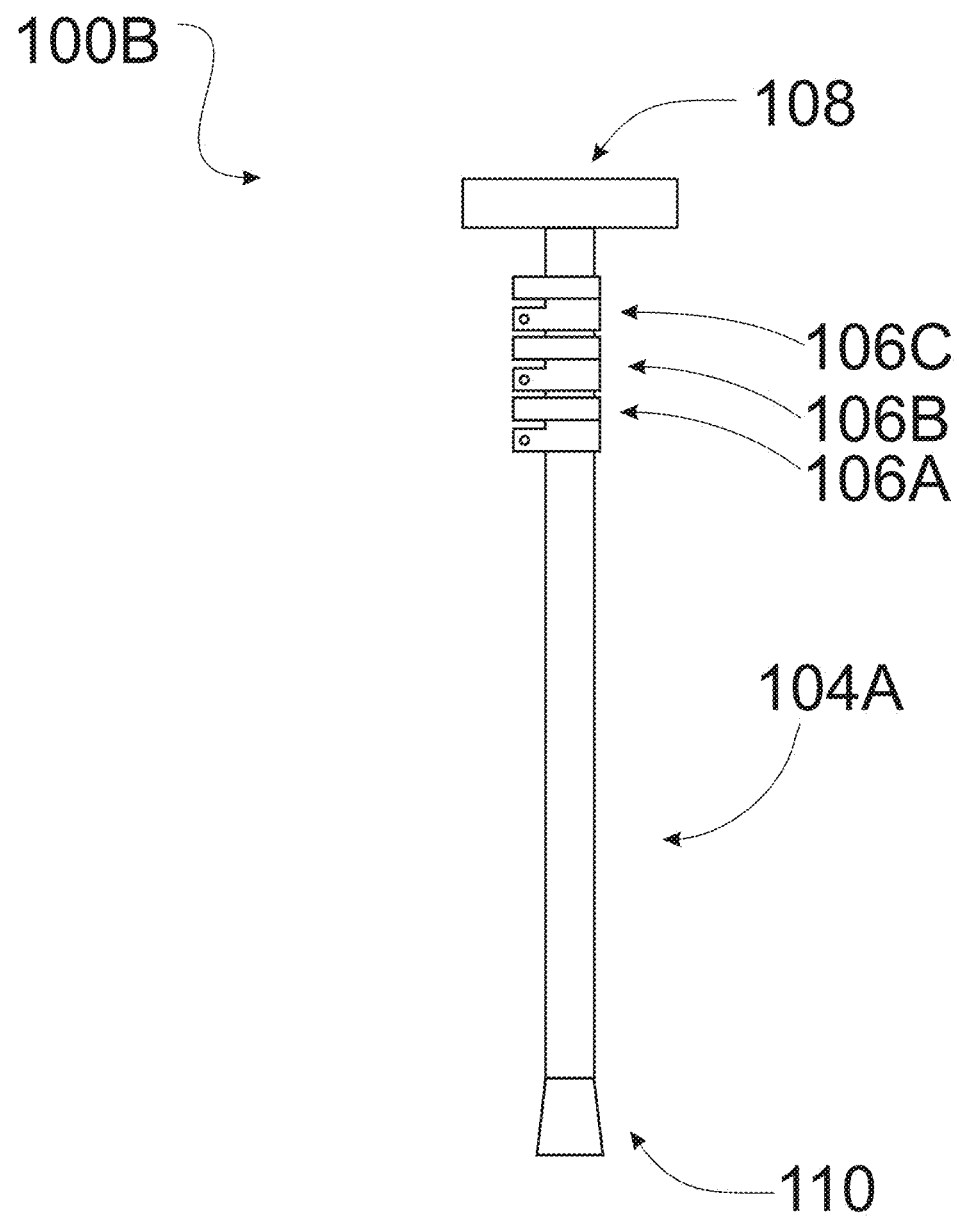
FIG. 2 is a front view of the steady staff in a retracted position according to an embodiment of the present invention.

Referring now to FIG. 2, the steady staff in a retracted position 100B is illustrated. The steady staff retracts conveniently to a compact length of approximately 25 inches, significantly enhancing its portability and ease of handling. This compact retracted dimension allows users to effortlessly transport the staff in backpacks, carry-on luggage, or even strapped externally to hiking gear, making it ideal for travel, outdoor adventures, or everyday convenience. The relatively short retracted length also ensures straightforward storage, whether at home, in vehicles, or when space is limited. Moreover, the 25-inch length promotes ease of handling during setup, adjustment, and breakdown, facilitating comfortable and efficient usage by users of various physical abilities and in a variety of environments.

In the desired configuration utilizing the carbon fiber material, the steady staff weighs approximately 1.25 pounds making it excellent for handling and for use with users having challenges with physical conditions, by individuals who experience conditions such as essential tremor.

As seen in FIG. 5, when the steady staff is fully extended 100A it is generally taller than the user 200 configured to utilize the device. The invention is intended to be taller than the user using the device which provides stability benefits compared to shorter support devices. More specifically, when fully extended to approximately 75 inches, the steady staff significantly enhances stability compared to shorter support devices, particularly for users who are shorter than the maximum extension length. For instance, a user standing 63 inches tall benefits greatly from a staff that extends above their height, as it provides increased leverage and improved balance control. The additional height allows the user to adopt a more upright, ergonomic posture, minimizing body strain and enhancing overall steadiness. Moreover, the taller staff allows for a wider, more stable stance, enabling the user to maintain balance more effectively on uneven, sloped, or challenging terrains. This extended length is particularly beneficial for individuals with balance or stability challenges, offering increased confidence and safety during outdoor activities. In this position, the user is configured to grip a segment of the telescoping body during use.

Figure 6:
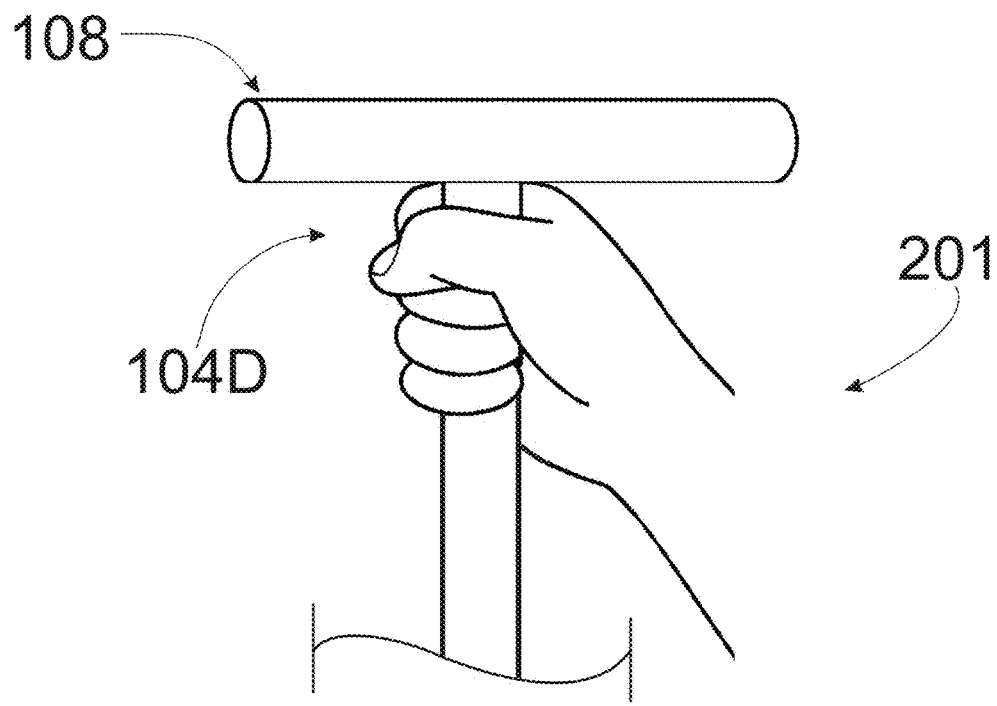
FIG. 6 is a detailed view of the steady staff in use according to an embodiment of the present invention.

As shown in FIG. 6, in some embodiments, the user may grasp the segment portion (104D) of the telescoping body located directly beneath the crosspiece 108 with their hand 201 when the steady staff is retracted or extended to a desired length. This hand placement allows the user to position the crosspiece at a desired height and orientation during use. It is important to note that the crosspiece 108 is not designed to function as a handle for gripping or bearing weight. Rather, it serves as a stable, cushioned support platform for optical or other auxiliary devices, as described elsewhere herein. In one embodiment, the crosspiece is structurally calibrated to withstand approximately 30 pounds of downward pressure when the telescoping body is fully extended. However, it is not intended or suitable for supporting the full body weight of the user. In such embodiments, the user's hand 201 functions to guide or lift the crosspiece indirectly by applying upward force immediately beneath it as the steady staff is repositioned or moved.

Best seen in FIG. 7, beyond its primary role in enhancing user stability, the steady staff offers significant versatility by functioning as a reliable support for equipment such as cameras 300A and binoculars 300B. The staff's foam-covered cross-piece provides a secure, cushioned resting point, stabilizing delicate optical devices and substantially reducing vibration or tremor-induced movement during use. Additionally, the steady staff serves as a practical structural support pole for temporary shelters or tarps 300C. Its adjustable height of up to approximately 75 inches facilitates varied shelter configurations, enabling users to achieve adequate headroom, weather protection, and overall shelter stability. This multifunctional capability makes the Steady Staff uniquely adaptable to diverse outdoor scenarios, enhancing its practical value for activities such as camping, wildlife observation, photography, and emergency preparedness.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A telescopic staff apparatus comprising:
   a telescopic body including a plurality of tubular sections, each tubular section being dimensioned to slide at least partially within an adjacent tubular section, wherein the telescopic body is adjustable between a retracted configuration and an extended configuration, wherein the retracted configuration has a length of 25 inches, and in the extended configuration has a length of 75 inches;
   a plurality of locking clamp mechanisms, each locking clamp mechanism being configured to releasably secure a pair of adjacent tubular sections at a selected telescopic length;
   a cross-piece assembly positioned at an upper portion of the telescopic body, the cross-piece assembly comprising an interior rigid tubing support member constructed from aluminum having an outer diameter of ¾ inches, the interior rigid tubing support member encased in a cushioning material of foam rubber having a thickness of ¼ inches, wherein the cross-piece has a lateral dimension of approximately 5.5 inches, such that it extends transversely relative to the longitudinal axis of the telescopic body, and wherein the cushioning material is configured to reduce vibrations and provide a resting surface for an accessory device, and
   a tip disposed at a lower end portion of the telescopic body, wherein the tip comprises a rubber material having a traction-enhancing surface to promote stability on varying terrains.

2. The telescopic staff apparatus of claim 1, wherein each tubular section is constructed from carbon fiber and the total weight of the telescopic staff is approximately 1.25 lbs.

3. The telescopic staff apparatus of claim 1, wherein the crosspiece is structurally calibrated to withstand approximately 30 pounds of downward pressure when the telescoping body is in the extended configuration.

4. The telescopic staff apparatus of claim 1, wherein the locking clamp mechanisms each comprise a flip-lock clamp configured to permit selective sliding movement of an adjacent tubular section and to secure the adjacent tubular section in place upon engagement of the flip-lock clamp.

5. The telescopic staff apparatus of claim 1, further comprising one or more fasteners coupling the cross-piece assembly to the uppermost tubular section.

6. The telescopic staff apparatus of claim 1, wherein the plurality of tubular sections comprises exactly four tubular sections that are cylindrical in shape and sized in descending outer diameters so that each smaller-diameter section is receivable in a larger-diameter section.

7. The telescopic staff apparatus of claim 1, wherein, when fully extended, the telescopic staff apparatus is taller than an average user's height to enhance user stability during use.

8. The telescopic staff apparatus of claim 1, wherein the accessory device is a pair of binoculars or a camera.

9. A method of providing stability to a user during an outdoor activity, the method comprising: providing a telescopic staff having a plurality of tubular sections adjustable between an extended configuration up to 75 inches and a retracted configuration of about 25 inches, a cross-piece assembly on an upper portion thereof, the cross-piece assembly comprising an interior rigid tubing support member constructed from aluminum, the interior rigid tubing support member encased in a cushioning material of foam rubber, wherein the cross-piece has a lateral dimension of approximately 5.5 inches, and a tip on a lower portion thereof; extending the telescopic staff to a desired length suitable for the height of the user and the terrain; locking each tubular section in place by engaging a corresponding locking clamp mechanism; gripping a segment of the telescopic staff just below the cross-piece to guide or lift the crosspiece indirectly by applying upward force immediately beneath the cross-piece as the telescopic staff is repositioned or moved; and supporting the user's weight on the telescopic staff to enhance balance and reduce vibrations due to tremors or uneven ground.

10. The method of claim 9, further comprising resting an optical device on the cross-piece assembly to stabilize the optical device during observation.

11. The method of claim 9, further comprising utilizing the telescopic staff as a support pole to hold a portion of a tarp or temporary shelter in place.

12. The method of claim 9, wherein the telescopic staff is constructed at least partially of carbon fiber so as to weigh approximately 1.25 pounds for improved portability and ease of handling by users with reduced strength.

13. The method of claim 9, further comprising adjusting the telescopic staff to a height above the user's shoulder level to increase leverage and stability during hiking or walking activities.

14. The method of claim 9, wherein the tip comprises a rubber foot configured to provide traction on a variety of terrains.

15. The method of claim 9, wherein locking each tubular section comprises a further step of engaging a flip-lock clamp, positioning a given tubular section at a desired length, and flipping the clamp to secure the tubular section in a fixed position.

\* \* \* \* \*